No. 849,233. PATENTED APR. 2, 1907.
P. HANSEN & G. W. FOOTE.
MACHINE FOR CORING AND SLICING FRUIT.
APPLICATION FILED OCT. 30, 1905.
2 SHEETS—SHEET 2.
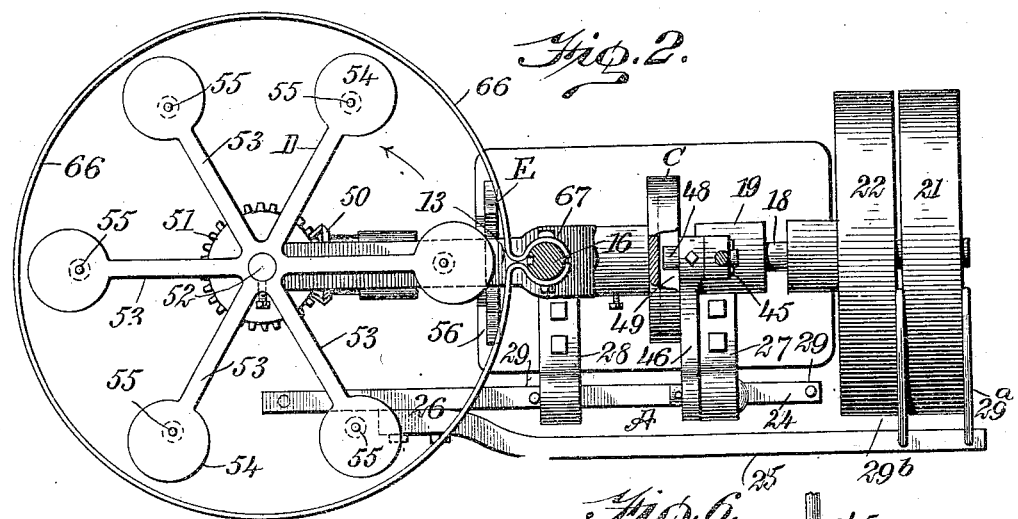
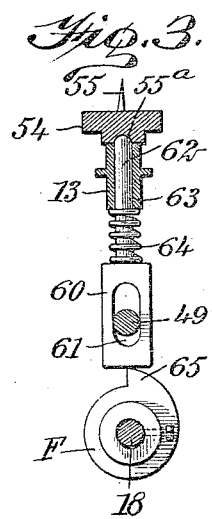
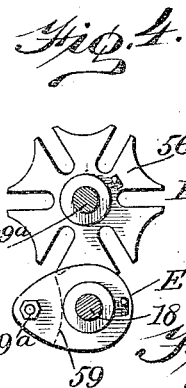
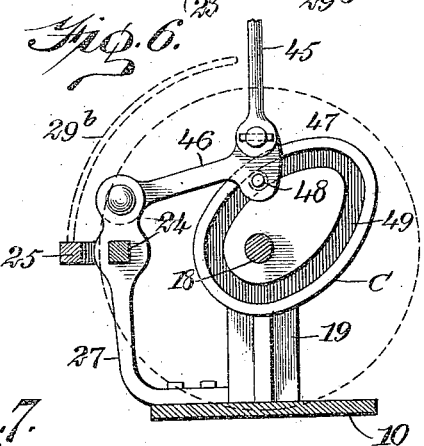
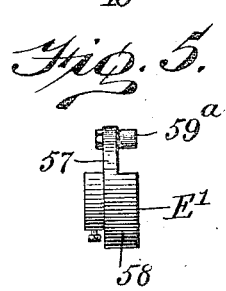
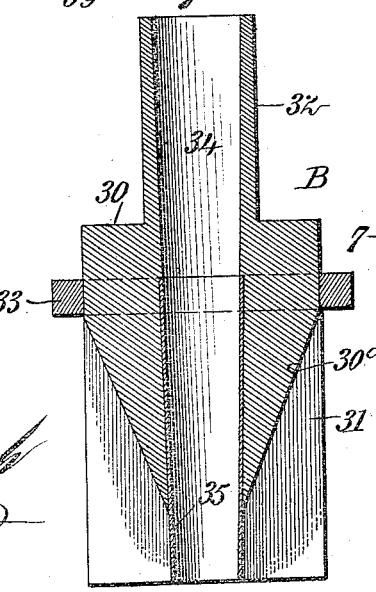
WITNESSES:
INVENTORS
Peter Hansen
George W. Foote
BY
ATTORNEYS

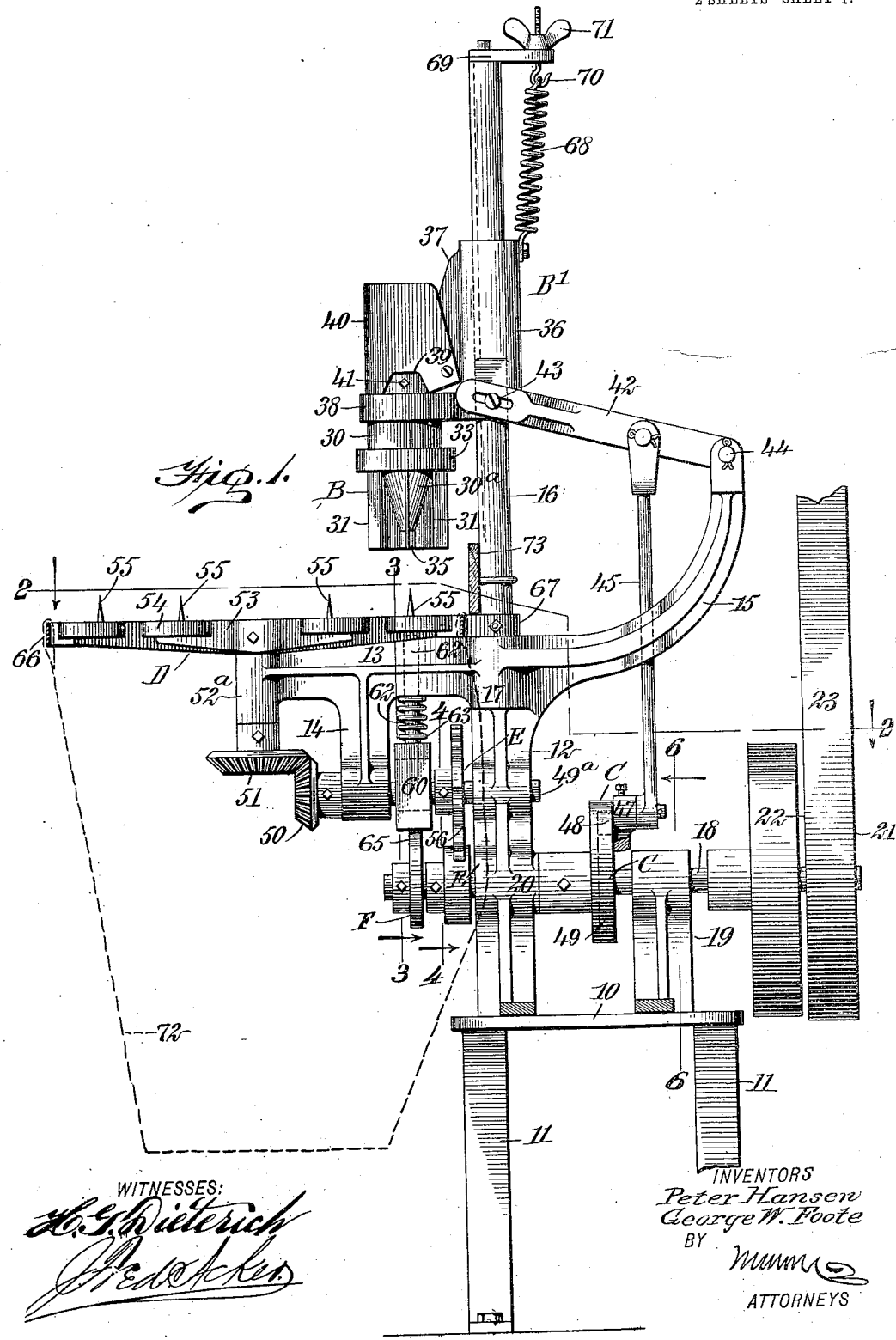

UNITED STATES PATENT OFFICE.

PETER HANSEN, OF JERSEY CITY, NEW JERSEY, AND GEORGE W. FOOTE, OF NEW YORK, N. Y.

MACHINE FOR CORING AND SLICING FRUIT.

No. 849,233.

Specification of Letters Patent.

Patented April 2, 1907.

Application filed October 30, 1905. Serial No. 285,055.

*To all whom it may concern:*

Be it known that we, PETER HANSEN, a resident of Jersey City, in the county of Hudson and State of New Jersey, and GEORGE W. FOOTE, a resident of the city of New York, borough of Manhattan, in the county and State of New York, citizens of the United States, have invented a new and Improved Machine for Coring and Slicing Fruit, of which the following is a full, clear, and exact description.

The purpose of the invention is to provide a simple, durable, and economic machine for simultaneously coring and slicing apples in such manner that the coring and slicing will be cleanly and rapidly accomplished and so that the slices will be of uniform thickness.

A further purpose of the invention is to provide a machine in which the various operations will be automatically accomplished and so timed that there is no danger of mishap to the fruit and so that but one attendant, a feeder, is required for the machine.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the machine. Fig. 2 is a horizontal section taken practically on the line 2 2 of Fig. 1. Fig. 3 is a vertical section taken practically on the line 3 3 of Fig. 1. Fig. 4 is a vertical section taken practically on the line 4 4 of Fig. 1. Fig. 5 is a detail edge view of the cam for operating the shifting mechanism and which is shown prominently in Fig. 4. Fig. 6 is a vertical section taken substantially on the line 6 6 of Fig. 1; and Fig. 7 is an enlarged vertical section through the cutter and corer, taken practically on the line 7 7 of Fig. 8; and Fig. 8 is a bottom plan view of the cutter.

The frame of the machine is preferably constructed as shown in Fig. 1, wherein it comprises a table 10, usually supported by legs 11, and a standard-section 12, secured to or integral with the table, together with a horizontal head-section 13, extending from one side of the standard-section and provided with a downwardly-extending hanger 14 and an arm 15, which extends from the standard-section opposite the head-section. A post 16, circular in cross-section, is located at the upper end portion of the standard-section 12 of the frame and may be secured in a socket 17, produced in said standard-section, or the said post 16 may be an integral portion of the frame.

The drive-shaft 18 is mounted to turn in an upright hanger 19, secured to the table 10, and in a bearing 20, produced in the standard-section 12 of the frame, and the said drive-shaft 18 extends beyond both sides of said standard-section, as is illustrated in Fig. 1.

Two pulleys 21 and 22 are located on the longer end portion of the drive-shaft 18, either pulley being adapted to receive a driving-belt 23, and one of the said pulleys is a driving-pulley, being fast on the shaft, and the other pulley is a loose pulley.

In connection with the pulleys just described a shifting mechanism A is employed. (Shown best in Fig. 2.) This shifting mechanism consists of two parallel bars, an inner bar 24 and an outer bar 25, the outer bar extending beyond the right-hand end of the inner bar and the inner bar extending beyond the left-hand end of the outer bar, and the left-hand end portion of the outer bar 25 is secured in any suitable or approved manner to the inner bar 24, as shown at 26 in the said Fig. 2. The inner bar 24 is mounted to slide in posts 27 and 28, which are secured to the table 10 and extend outward and upward therefrom, as is best shown in Fig. 6, and the said inner bar 24 is limited in its movement by suitable stops 29. At the right-hand end of the outer bar 25 two fingers 29$^a$ and 29$^b$ are secured, which fingers are curved in direction of the pulleys 21 and 22, and the space between the said fingers 29$^a$ and 29$^b$ is sufficient to loosely receive the driving-belt 23. In fact, the fingers 29$^a$ and 29$^b$ serve as guides for the belt, and by moving the bars of the shifting mechanism backward or forward the belt 23 is carried from one to the other of the pulleys 21 and 22, according to whether it is intended to start or to stop the machine.

The cutter B is shown in section in Fig. 7 and in side elevation in Fig. 1. This cutter consists of a circular body 30, having a lower tapering or conical section 30$^a$, and in the exterior of the said tapering section 30ª and in the adjacent portion of the main circular section of the body vertical slots are produced at regular intervals apart, and said slots may be placed as close together as may be desired. Blades 31, adapted to serve as slicing-blades, are introduced into said slots, and the outer longitudinal edges of the blades 31 are straight and likewise their bottom edges, and the said blades extend a predetermined distance beyond the bottom portion of the conical section 30ª of the said body B, as is shown in both Figs. 1 and 7, and when the blades 31 are in place in the said body their outer longitudinal edges are substantially flush or in vertical alinement with the outer face of the upper main circular section of the said body 30, as is clearly shown in Fig. 7.

The blades are held in place in any suitable or approved manner—as, for example, through the medium of a clamping-ring 33 passed over the upper circular body portion of the cutter to a point where the conical section 30ª commences—and the said body portion 30 of the cutter B is provided with an upwardly-extending centrally-located shank 32. This shank 32 is provided with a downwardly-tapering bore 34, which bore is continued in its tapering form throughout the body 30 to the lower end thereof, and in that portion of the bore 34 which passes through the conical section 30ª of the body 30 a tapering tubular steel cutter 35 is secured in such manner that its inner wall is flush with the inner wall of that portion of the bore in the shank 32 and adjacent portion of the body, so that the cutter 35, which is a core-cutter, constitutes practically a continuation of the bore 34 in said shank 32. The tubular or core cutter 35 extends a sufficient distance beyond the lower end of the conical section 30ª of the body 30 of the cutter to be flush at its lower end with the lower edges of the slicing-plates 31.

A carrier B' is adapted to receive the cutter B, the cutter being removably connected with the carrier. As is shown in Fig. 1, this carrier consists of a sleeve 36, which is mounted to slide on the post 16, extending up from the frame of the machine, and is held from turning on said post by means of a feather on the post, for example, entering a groove in the sleeve 36. The sleeve 36 at its left-hand side is provided with cheek-pieces 37, which are downwardly-inclined, and these cheek-pieces 37 are integral with a band or ring 38, which is also integral with the bottom portion of the sleeve 36. The tapering bore 34 enables the cores to free themselves as they pass upward, and therefore prevents them from clinging in the cutter, and in order that the cores may be directed to any desired place away from the machine usually a conducting-shield 40 of any approved form is attached to the cheek-pieces 37 and is located over the upper end of the cutter B. The said cutter is removably held in said carrier by passing bolts 41 through ears 39, formed on the ring 38, and into the shank-section 32 of the cutter. When the cutter is in position in the carrier B', the upper edge of its body portion 30 fits snugly against the under face of the ring or band 38, as is illustrated in Fig. 1.

The carrier B' is raised and lowered in the following manner: A link 42 is forked at its forward end, and the said forked portion of the link is slotted to receive between its members the lower end of the carrier-sleeve 36, as is illustrated in Fig. 1, and pivot-pins 43 are passed through the slots in the forked portions of the link and into the said sleeve. The outer or rear end of the link 42 is pivotally attached to the upper end of the upwardly-curved arm 15 of the frame, as is illustrated at 44 in Fig. 1. A connecting-rod 45 is pivotally connected with the link 42, and this rod 45 is carried downward in direction of the main or drive shaft 18, and said rod 45 is pivotally attached to the upper portion of an elongated head 47 of an arm 46, pivoted to one of the upright bracket-arms 27, as is best shown in Fig. 6, and the said head 47 at its lower portion carries a friction-roller 48, which friction-roller is made to travel in an oval race 49, produced in one side of an oval cam C, which cam is secured to the drive-shaft 18, as is shown in Figs. 1 and 6. Thus in operation as the drive-shaft 18 is revolved when the point of the cam receives a friction-roller 48 the carrier B' and consequently the cutter B are carried upward, and when the roller 48 reaches the butt or wider end portion of said cam the cutter and its carrier are brought downward, so that the cutter may be operated to slice and core the fruit.

A line-shaft 49ª is journaled at one end in suitable bearings in the standard-section 12 of the frame above the drive-shaft and extends beyond the inner end of said drive-shaft, and said shaft 49ª is also journaled in a hanger 14, forming a portion of the upper horizontal member 13 of the frame. This shaft 49ª at what may be termed its "outer" or "forward" end is provided with an attached bevel-gear 50, which meshes with a similar gear 51, secured to the lower end of a shaft 52, the said shaft being mounted to turn in a suitable bearing 52ª, formed at the outer end of the upper horizontal section of the frame, as is also best shown in Fig. 1.

A table D is attached to the upper end of the shaft 52, and the said table is of spider construction, comprising a series of arms 53, which radiate from a common hub, and platforms 54 at the outer ends of the said arms, the said platforms being usually of circular shape. The table D, which is adapted to be periodically rotated, may be provided with any desired number of arms 53; but usually six of said arms are employed in its construction. Each platform 54 of the table is provided with an upwardly-extending spike 55. The table is so located that as it is turned any one of the platforms 54 may be brought beneath the cutter B, and when a platform is in proper registry with the cutter the spike 55 of that platform will be in alinement with the central portion of the cutter.

The table D is periodically revolved through the medium of a star-wheel E and a coacting elliptical cam E'. (Shown best in Fig. 4.) The star-wheel E is secured to the upper or line shaft $49^a$, and its teeth 56 correspond in number to the number of arms 53 of the table D, and the upper or peripheral edges of the teeth 56 of the star-wheel are concaved. The elliptical cam E' is secured just below the star-wheel E upon the drive or main shaft 18, and in the construction of this cam E' its pointed section is thinner than the larger or butt section, and the division is marked by a concaved shoulder 59, which is located between the hub of the cam and its point, which shoulder occurs only at one side of the cam, and at the said point of the cam E' a friction-roller $59^a$ is mounted to turn, being opposite the shoulder 59. In the operation of the drive-shaft 18 the friction-roller $59^a$ will enter a space between opposing teeth 56 of the star-wheel E and turn the said wheel the distance of one tooth; and by so doing the shaft 49 is revolved a sufficient distance to cause the table D to move far enough to carry one platform from beneath the cutter and place another in its stead. The concaved shoulder 59 is provided in order that the edge of the teeth 56 of the star-wheel E may not interfere with the action of the cam when the cam is to act upon the wheel, and the concaved outer edges of the teeth 56 are provided in order that the body of the cam at its periphery may fit to the tooth beneath which it revolves when the cam is not acting upon the wheel.

The cams C and E' are so placed that they will have timed movement relative to each other. Thus when the cam C is acting to carry the cutter B to its upper position the point of the cam E' will act upon the star-wheel E to turn the same, and consequently turn the table D to effect a change of platforms, and the said cam E' remains inactive during the time that the cutter is carried down to engage with the fruit placed on the platform beneath it and core and slice the same.

It is very necessary that the wheel D shall be locked just prior and during the time that the cutter is acting upon the fruit, and this is accomplished by the mechanism shown in Figs. 1 and 3. This locking device consists of an elongated block 60, having an elongated slot 61 therein, through which the shaft $49^a$ loosely passes, so that the block can have vertical movement on the shaft, and this block is placed in such position that it will be about centrally beneath the cutter B. The said block is provided with an upwardly-extending attached or integral stem 62, and said stem has sliding movement in an opening 63, produced in the upper horizontal member 13 of the frame. The upper end of the stem 62 is adapted to enter a recess $55^a$ in the bottom of a platform 54, as each platform of the table D is provided with such a recess. (Shown particularly in Fig. 3.) A spring 64 is coiled around the stem 62, having bearing against the frame member 13 and against the block 60, the spring having a tendency to force the block and its stem downward or away from the table. This locking-block and stem are operated periodically through the medium of a cam F, the said cam being secured upon the main or drive shaft 18.

The cam F is provided with a disk-like body having a gradual peripheral rise 65, which rising section 65 at its highest point is connected with the body by a straight line, and the lower portion of the block 60 is adapted to rest upon the periphery of said cam. When the rising section 65 of the cam is in engagement with the locking-block 60, it will force the said block upward, so that its stem will enter the race in the platform above it; but as soon as this section 65 of the cam passes by the said locking-block 60 the said block will fall to the peripheral portion of the body of the cam and the locking device will be instantly carried out of locking engagement with the table.

The cam F acts to raise the locking-block just at that moment after the cam E' and the star-wheel E have placed a platform beneath the cutter B, and the release of the platform is effected by causing the rise 65 of the cam F to leave the locking-block 60 just prior to the next engagement of the cam E' with the star-wheel E to turn the wheel D the distance of another arm. The carrier B' is assisted in its upward or return movement by attaching a spring 68 to the upper end of the sleeve 36 and to a horizontal arm 69, secured to the upper end of the post 16, the attachment with said arm being usually effected through the medium of an eyebolt 70 and a nut 71.

In operation the fruit is first pared by hand or by machine and is placed upon the spikes 55 on the platforms of the tables D, and all of the platforms can be readily supplied by a single attendant. The drive-shaft 18 having been set in motion, the various operative parts of the machine operate automatically and at proper intervals through the medium of the cams C, E', and F and their coacting parts—as, for example, if the cutter has just cored and sliced the fruit upon one platform 54, just as the cutter commences to rise through the action of the cam C the cam F releases the locking-block 60, causing said block to drop away from the table, and almost immediately the cam E' operates upon the star-wheel to revolve the table D the distance between one of the arms, bringing another platform beneath the cutter. The cam E' then ceases to act upon the star-wheel, and the cam F commences to act on the locking-block 60 to force the stem of the said block to a locking engagement with the platform just placed in position, at which time the cam C will have caused the cutter B to descend and core and slice the fruit beneath it.

As heretofore stated, the table D is of spider-like construction, so as to permit the slices of fruit to drop down through the spaces in the table, where the fruit is received into a canvas chute 72, for example, and conducted by said chute to any desired receptacle. This chute is held in position by attachment to a ring-frame 66, which surrounds the table D, as is shown in Figs. 1 and 2, the said ring-frame being provided with clamping members 67 for attachment to the lower portion of the post 16, and just above the ring-frame 66 where it connects with the post 16 a deflecting-board 73 is preferably secured to said post to prevent the slices passing off at the rear of the machine, compelling the slices to drop into the chute 72. The conical shape of the cutter where the blades are located effectually prevent the slices remaining on the cutter, as their tendency is to fall therefrom, and if by any chance a slice should stick it is quickly dislodged at the next downward movement of the cutter.

Having thus described our invention, we claim as new and desire to secure by Letters Patent—

1. In a machine for slicing and coring fruit, the combination with a frame, a post extending up from said frame, and a carrier mounted to slide on the said post, of a table mounted to revolve in the frame adjacent to the post, the said table consisting of a hub, arms radiating from the said hub, platforms at the ends of the said arms, said platforms being provided with projections on their upper faces, a cutter and corer located in the said carrier, means for intermittently moving said carrier toward and from the platform, and means connected with said moving means for partially rotating the table during the intermissions of the movement of the carrier, and a connection between the line-shaft and the drive-shaft for periodically moving the line-shaft.

2. In a machine for slicing and coring fruit, the combination with a frame, a drive-shaft mounted in the frame, a line-shaft above the drive-shaft, a post extending up from the said frame, and a carrier mounted to slide on the said post, of a spider-like table mounted to revolve in the frame adjacent to the post, the said table consisting of a hub, arms radiating from the said hub, platforms at the ends of the said arms, which platforms are provided with projections, a cutter and corer located in the said carrier and adapted to slide to and from a platform of the table, an oval cam provided with a corresponding race, mounted on the said drive-shaft, an elliptical cam likewise mounted on the drive-shaft and provided with a friction-roller at its point, a link pivotally connected with the carrier and with the frame, an arm pivoted to the link, extending in direction of the drive-shaft and provided with a head having a friction-roller which enters the race of the oval cam, a connecting-rod attached to the head of the latter arm and to the said link, a gear connection between the line-shaft and the said table, whereby to revolve the same, and a star-wheel secured upon the said line-shaft, the teeth whereof correspond in number to the number of the arms of the said table, the roller of the elliptical cam being adapted to periodically enter the spaces between the teeth of the star-wheel, the two cams having timed movement relative to each other.

3. In a machine for slicing and coring fruit, the combination with a frame, a drive-shaft mounted therein, a line-shaft located above the drive-shaft, a post extending from the upper portion of the frame, a spider-like table mounted to revolve in the upper portion of the frame adjacent to the post, the arms of the spider-like table terminating in a platform, a driving connection between the line-shaft and the said table, and a combined cutter and corer having a support mounted for sliding and guided movement on the said post to and from a platform of the said table, of an oval cam mounted on the said drive-shaft, having a correspondingly-shaped recess in one of its faces, a link pivoted to the frame and having pivotal connection with the support for the cutter, a connecting-rod pivoted to the link, a pivoted guide for the lower end of the said connecting-rod, a roller on the said guide, which travels in the race of the said cam, an elliptical cam likewise mounted on the said drive-shaft, provided with a roller at its point, a star-wheel secured on the line-shaft, the teeth whereof correspond in number to the arms of the table, the roller of said elliptical cam being adapted to periodically enter the spaces between the teeth of the star-wheel, a spring-controlled locking-block having sliding movement on the line-shaft and provided with a stem having guided movement in the frame and adapted for locking engagement with the platform of the said table, and a cam secured on the said drive-shaft, having periodical lifting action on the said locking-block to carry its stem in locking engagement with a platform of the table, all of the said cams having timed movement with relation to each other.

In testimony whereof we have signed our names to this specification in the presence of two subscribing witnesses.

PETER HANSEN.
GEORGE W. FOOTE.

Witnesses:
JOHN F. KOHLER,
ARTHUR G. BUTLER.